Oct. 9, 1962 W. S. KREISMAN 3,057,203
GAS PRESSURE MEASUREMENT AND IDENTIFICATION
Filed Sept. 15, 1959
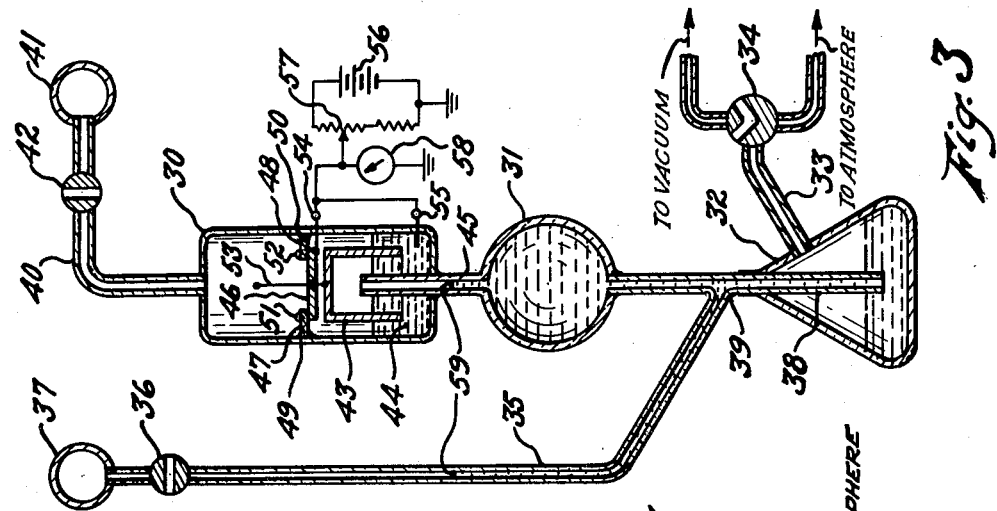
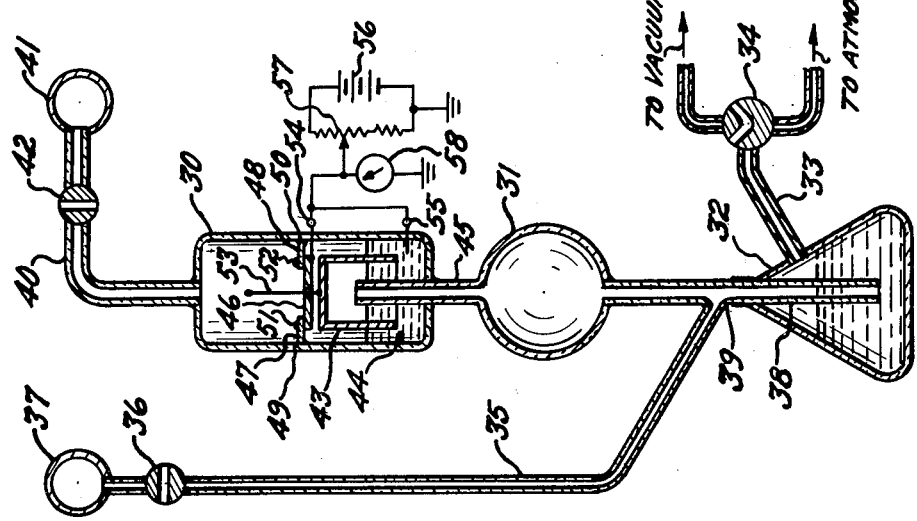
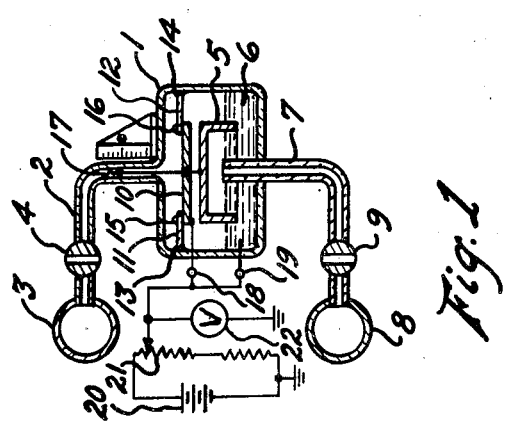
INVENTOR.
WALLACE S. KREISMAN
BY
ATTORNEYS

United States Patent Office 3,057,203
Patented Oct. 9, 1962

3,057,203
GAS PRESSURE MEASUREMENT AND IDENTIFICATION
Wallace S. Kreisman, Malden, Mass., assignor to the United States of America as represented by the Secretary of the Air Force
Filed Sept. 15, 1959, Ser. No. 840,210
4 Claims. (Cl. 73—398)
(Granted under Title 35, U.S. Code (1952), sec. 266)

The invention described herein may be manufactured and used by or for the United States Government for governmental purposes without payment to me of any royalty thereon.

This invention relates to pressure gauges and more particularly a gauge to be utilized as a standard capable of measuring extremely low pressures directly.

One of the methods utilized to identify an unknown gas is comprised of sampling aforesaid unknown gas and measuring one of the significant characteristics thereof, namely, the pressure. The measured pressure may then be compared to a table listing the pressure of each known gas. Thus, there may be an identification of a gas by the pressure characteristics thereof. The present invention includes an improved pressure measuring apparatus for identification of gas.

The present invention provides an "absolute" pressure gauge which measures pressures as low as $10^{-8}$ mm. of mercury. This pressure region is out of the range of the prior art "absolute" gauges. By an "absolute" gauge is meant one whose calibration depends only on measurements of length, mass, and time. The commonly used ionization, cold cathode discharge, pirani, thermocouple, and Alphatron gauges must all be calibrated against an absolute type of gauge.

One of the prior art gauges which is used as a standard-absolute instrument in most laboratories is supposed to give pressure readings down to $10^{-6}$ mm. of mercury, but in actuality the readings become erratic and unreliable below a pressure of about $10^{-4}$ mm. of mercury. The chief difficulty with the aforementioned gauge is that for low pressures the liquid (usually mercury) tends to stick in the fine capillaries. There is also difficulty in obtaining the proper height of liquid in one of the capillaries and in reading the liquid meniscus.

The invention described herein as the Absolute High Vacuum Gauge eliminates the worst feature, that of sticking. Because of this, the present novel gauge is more accurate and will give more reproducible readings than the prior art gauges. In addition to improved accuracy and reliability, the present gauge provides additional means for magnifying pressure. This means that lower pressures may be measured in an absolute fashion.

A further novel feature of the present gauge makes it a null type of balanced instrument. The pressure force which would ordinarily give rise to a mechanical displacement in the prior art gauges is balanced out by a calibrated electrical, magnetic, or mechanical force. The magnitude of the balancing force is a measure of the pressure. The chief advantages of the method are twofold: first, it makes possible the use of a constant compression ratio for one portion of the complete system, and second, it eliminates any surface tension or wetting effects. A third advantage is that the gauge may be zeroed before each reading to compensate for any changes in the equilibrium position of the cylinder due to temperature or other factors.

In one embodiment of the present invention one portion of the gauge is used to compress the sample gas being measured, and the other portion of the gauge is used to measure the actual pressure of the compressed gas with great sensitivity, accuracy, and reproducibility.

An object of the present invention is to provide a novel absolute high vacuum pressure gauge.

Another object of the present invention is to provide a novel absolute pressure gauge to measure extremely low pressures.

Still another object of the present invention is to provide an absolute pressure gauge to be utilized as a standard.

Yet another object of the present invention is to provide an absolute pressure gauge having a null type of balancing.

For a better understanding of my invention, together with other and further objects, advantages and capabilities thereof reference is made to the following description and appended claims in connection with the accompanying drawings in which:

FIGURE 1 is a view partly schematic and partly in mechanical section of apparatus incorporating principles of the invention; and FIGURE 2 is a longitudinal, sectional view of the apparatus constituting a second embodiment of the invention showing the initial measurement position; and FIGURE 3 is a longitudinal sectional view of the apparatus constituting the second embodiment of the invention showing the final measurement position of said apparatus.

Now referring in detail to FIGURE 1, there is shown glass vessel 1 which is adapted to be evacuated by means of conduit 2 leading to vacuum pump 3 under control of valve 4. Vessel 1 contains a buoyant element 5 supported upon a body of mercury 6 surrounding a conduit 7 connecting the chamber within buoyant element 5 to alternate source of gas and vacuum pump 8 which is under control of valve 9. Buoyant element 5 is comprised of a conductive metal such as stainless steel and is in the shape of a cylinder with its top end closed. The element floats vertically upon body of mercury 6 with its open end submerged therein.

Vessel 1 has also contained therein conductive disc 10 which is utilized as a balancing electrode, having a passageway disposed therethrough and the disc having its bottom surface in parallel to the top surface of the closed end of buoyant element 5. Disc 10 is arranged in an immovable position and spaced from the closed end of buoyant element 5 by brackets 11 and 12. Bracket 11 is bonded to the inner surface of vessel 1 at point 13 and bracket 12 at point 14. Bracket 11 is riveted to disc 10 at point 15 and bracket 12 at point 16. The closed top end of buoyant element 5 has attached thereto calibrating rod 17 which extends through aforesaid passageway of discs 10 and is concentric therewith. Calibrating rod 17 extends partially into conduit 2 and is also concentric therewith.

Vessel 1 is provided with two electrodes 18 and 19. Electrode 18 is in electrical contact with conductive disc 10 and electrode 19 with body of mercury 6 thence to buoyant element 5. D.C. power source 20 is connected across potentiometer 21. The negative side of power source 20 is returned to ground. The center tap of potentiometer 21 is connected to electrodes 18 and 19 and also to ground by way of voltmeter 22.

In the operation of the apparatus of the present invention, the upper portion of glass vessel 1 is evacuated by means of vacuum pump 3 after which valve 4 is closed. The volume under buoyant element 5 is evacuated by the vacuum pump portion of the alternate gas source and vacuum pump 8. The position of the top of calibrating rod 17 is precisely noted as the zero point. Thereafter, a sample of the gas to be measured is introduced from alternate gas source and vacuum pump 8 by way of valve 9 and conduit 7 into the aforesaid chamber enclosed by buoyant element 5. The magnitude of the pressure of the gas introduced into aforesaid chamber tends to change the position of buoyant element 5 and attached calibrating rod 17 in relation to the top surface of mercury pool 6. The degree of upward movement of the buoyant element is a measure of the magnitude of the pressure of the sample gas.

As buoyant element tends to rise, potentiometer 21 is adjusted so as to place both buoyant element 5 and conductive disc 10 at a high potential of the same sign and of such a magnitude that a repulsive force between them is produced to such a degree that the electrostatic force will balance out precisely the pressure force thus retaining the top of calibrating rod 17 in its previously noted zero point. There is achieved a null type of balance. The magnitude of pressure of the gas sample can then be determined by the magnitude of potential necessary to maintain the aforesaid null balance. Voltmeter 22 indicates the magnitude of voltage necessary to achieve a null type of balance for the aforesaid gas sample, and consequently the pressure thereof. Voltmeter 22 may be calibrated to indicate the degree of pressure.

Now referring to FIGURE 2, there is shown a series of glass vessels 30, 31, and 32 of which lower vessel 32 has initially contained therein a quantity of mercury to a level just below the location of tube inlet conduit 33 constituting a means for alternate evacuation and entry of air to said vessel under the control of two way valve 34. Intermediate vessel 31 is adapted to receive sampling gas or mercury by way of a system of tubing leading thereto and including a section 35 and stop-cock 36 connecting with an alternate gas source and vacuum pump 37 and also including a section 38 extending from a point below the mercury level of vessel 32 to vessel 31 itself, the said section 38 having communication with section 35 at point 39 and being sealed to the outer walls of vessel 32 immediately below said junction point 39. Upper vessel 30 is adapted to be evacuated by means of a conduit 40 leading to vacuum pump 41 under control of valve 42. Vessel 30 also contains a buoyant element 43 supported upon a body of mercury 44 surrounding a conduit 45 connecting vessel 31 with the space within buoyant element 43. Buoyant element 43 is formed of a conductive metal such as stainless steel and in the shape of a cylinder with its top end closed, floating vertically with its pen end submerged in aforesaid mercury.

Vessel 30 also has contained therein conductive disc 46 having passageway therethrough and whose bottom surface is parallel to the top surface of the closed end of buoyant element 43. Disc 46 is arranged in an immovable position and spaced from the closed end of element 43 by brackets 47 and 48. Bracket 47 is bonded to the inner surface of vessel 30 at point 49 and bracket 48 in a similar manner at point 50. Bracket 47 is riveted to disc 46 at point 51 and bracket 48 in a similar fashion at point 52. The closed top end of buoyant element 43 has attached thereto calibrating rod 53 which extends through aforesaid passageway of disc 46 and is concentric therewith. Vessel 30 is provided with two electrodes 54 and 55. Electrode 54 is in electrical contact with conductive disc 46 and electrode 55 with body of mercury 44 to buoyant element 43. D.C. power source 56 is connected across potentiometer 57. The negative side of power source 56 is returned to ground. The center tap of potentiometer 57 is connected to electrodes 54 and 55 and also to ground by way of voltmeter 58.

The mode of operation is as follows: a good vacuum is obtained in the top portion of vessel 30 by means of vacuum pump 41 after which valve 42 is closed. The top portion of vessel 32 is evacuated by connecting conduit 33 to a vacuum pump by way of valve 34. The volume under buoyant element 43 is evacuated by the vacuum pump portion of the alternate gas source and vacuum pump 37. The zero position of buoyant element 43 is noted (with a low power microscope-micrometer) by observing the position of the top of calibrating rod 53.

The gas to be sampled is now introduced from alternate gas source and vacuum pump 37 by way of valve 36 thence through section 35 to section 38 to vessel 31 to section 45 and finally to the space enclosed by buoyant element 43.

Now referring in detail to FIGURE 3, the mercury at the bottom of vessel 32 has been raised to final position 59 by operation of two way valve 34 in which the initial evacuation position has been shifted to permit the controlled entrance of the atmosphere. Sufficient air is permitted to gain access to the top portion of vessel 32 by way of conduit 33 so that the pressure will raise the mercury to final positions 59 in sections 35 and 45.

As the mercury is being raised to position 59, a balancing potential is applied to disc 46 and buoyant element 43 by means of adjusting potentiometer 57 so that the zero position of calibrating rod 53 is maintained. When the mercury reaches final position 59, potentiometer 57 has been so selectively controlled that calibrating rod 53 is precisely at its zero position. The pressure of the sample gas is then determined by the magnitude of voltage indicated by voltmeter 58 or by calibrating said voltmeter to indicate the degree of pressure.

It is to be noted that in place of the buoyant element of stainless steel, there could be utilized one of high susceptibility steel and a solenoid magnet placed around the glass vessel enclosing the buoyant element and aforesaid magnet operated in such manner as to produce a magnetic type of balancing. There could also be utilized a mechanical weight and/or lever arrangement for balancing.

What is claimed is:

1. Apparatus for determining significant characteristics of a gas to be identified by such characteristics as gas pressures, said apparatus comprising, in combination with a vessel source containing the gas to be identified, a second vessel containing a quantity of mercury and an electrically conductive buoyant element partly immersed in said mercury so as to define a chamber above the surface level of said mercury, said chamber being sealed off from the remainder of said second vessel, means attached to said buoyant element for indicating the zero position of said buoyant element in relation to said mercury level, means for evacuating said second vessel exclusive of said chamber, means for introducing into said buoyant element chamber a quantity of gas from said gas source, a balancing electrode positioned above said buoyant element and spaced therefrom, means constituted in part by said quantity of mercury to impress upon said balancing electrode and said buoyant element a voltage of high potential and of the same sign, means to vary the magnitude of said impressed voltage upon the introduction of said gas into said chamber, said voltage being varied to retain said indicating means in said zero position, and means to measure the magnitude of the impressed voltage required to retain said zero position, the magnitude of said impressed voltage being directly dependent upon said pressure of said gas.

2. Apparatus for determining significant characteristics of a gas to be identified by such characteristics as gas pressures, said apparatus comprising, in combination with a source vessel containing the gas to be identified, a second vessel containing a quantity of mercury and an electrically conductive buoyant element partly immersed in said mercury so as to define a chamber above the surface level of said mercury, said chamber being sealed off from the remainder of said second vessel, means for evacuating said second vessel exclusive of said chamber, means for introducing into said buoyant element chamber a quantity of gas from said gas source, means attached to said buoyant element to indicate a zero position prior to the introduction of said gas into said chamber, a balancing electrode positioned above said buoyant element and spaced therefrom, means to impress a voltage of high potential of the same sign on said buoyant element and said balancing electrode, means to retain said indicating means in said zero position upon the introduction of said gas into said chamber by varying the magnitude of said voltage, and means to measure the magnitude of said impressed voltage.

3. Apparatus for determining significant characteristics of a gas to be identified by such characteristics as gas pressures, said apparatus comprising, in combination with a source vessel containing the gas whose pressure is to be measured, a second vessel containing a quantity of mercury; an electrically conductive buoyant element partly immersed in said mercury so as to define a chamber above the surface level of said mercury, said chamber being sealed off from the remainder of said second vessel; means for evacuating said second vessel exclusive of said chamber; means for introducing into said buoyant element chamber a quantity of gas from said gas source, said introducing means including an intermediate third vessel, a series of conduits connecting said gas source with said intermediate vessel and said chamber defined by the buoyant element in said second vessel, a fourth vessel containing a quantity of mercury occupying said fourth vessel to an intermediate level, means for applying a regulated fluid pressure to the surface of the mercury in said fourth vessel and thereby controlling the pressure exerted upon said buoyant element following such delivery of said gas to said chamber; means to indicate the zero position of said buoyant element prior to said introduction of said gas to said chamber; a balancing electrode positioned above said electrically conductive buoyant element and spaced therefrom; means to impress a voltage of high potential of the same polarity on said electrically conductive buoyant element and said balancing electrode; means to retain said indicating means in said zero position after the introduction of said gas into said chamber by varying the magnitude of said impressed voltage; and means to measure the magnitude of said impressed voltage.

4. Apparatus for determining significant characteristics of a gas to be identified by such characteristics as gas pressure, said apparatus comprising, in combination with a vessel source containing the gas to be identified, a second vessel containing a quantity of mercury; an electrically conductive buoyant element partly immersed in said mercury so as to define a chamber above the surface level of said mercury, said chamber being sealed off from the remainder of said second vessel; means attached to said buoyant element for indicating the zero position of said buoyant element in relation to said mercury level; means for evacuating said second vessel exclusive of said chamber; means for introducing into said buoyant element chamber a quantity of gas from said gas source, said introducing means including an intermediate third vessel; a series of conduits connecting said gas source with said intermediate third vessel and said chamber defined by said buoyant element in said second vessel; a balancing electrode positioned above said electrically conductive buoyant element and electrically spaced therefrom; a fourth vessel containing a quantity of mercury occupying said vessel to an intermediate level; means for applying a regulated fluid pressure to the surface of the mercury in said fourth vessel and thereby controlling the pressure exerted upon said buoyant element following such delivery of said gas to said chamber; means to impress an electrostatic force between said buoyant element and said balancing electrode to retain said indicating means in said zero position after said introduction of said gas into said chamber; and means to measure the magnitude of said electrostatic force.

References Cited in the file of this patent

UNITED STATES PATENTS

| | | |
|---|---|---|
| 1,877,810 | Chamberlain | Sept. 20, 1932 |
| 1,909,254 | Crowell | May 16, 1933 |
| 2,243,749 | Clewell | May 27, 1941 |
| 2,584,945 | Todd | Feb. 5, 1952 |
| 2,620,666 | Schmidt | Dec. 9, 1952 |